3,594,191
METHOD OF PROCESSING TUNA
James M. Lapeyre, 13 Richmond Place,
New Orleans, La. 70115
Filed Feb. 14, 1969, Ser. No. 799,403
Int. Cl. A22c 25/00, 25/18
U.S. Cl. 99—111                              30 Claims

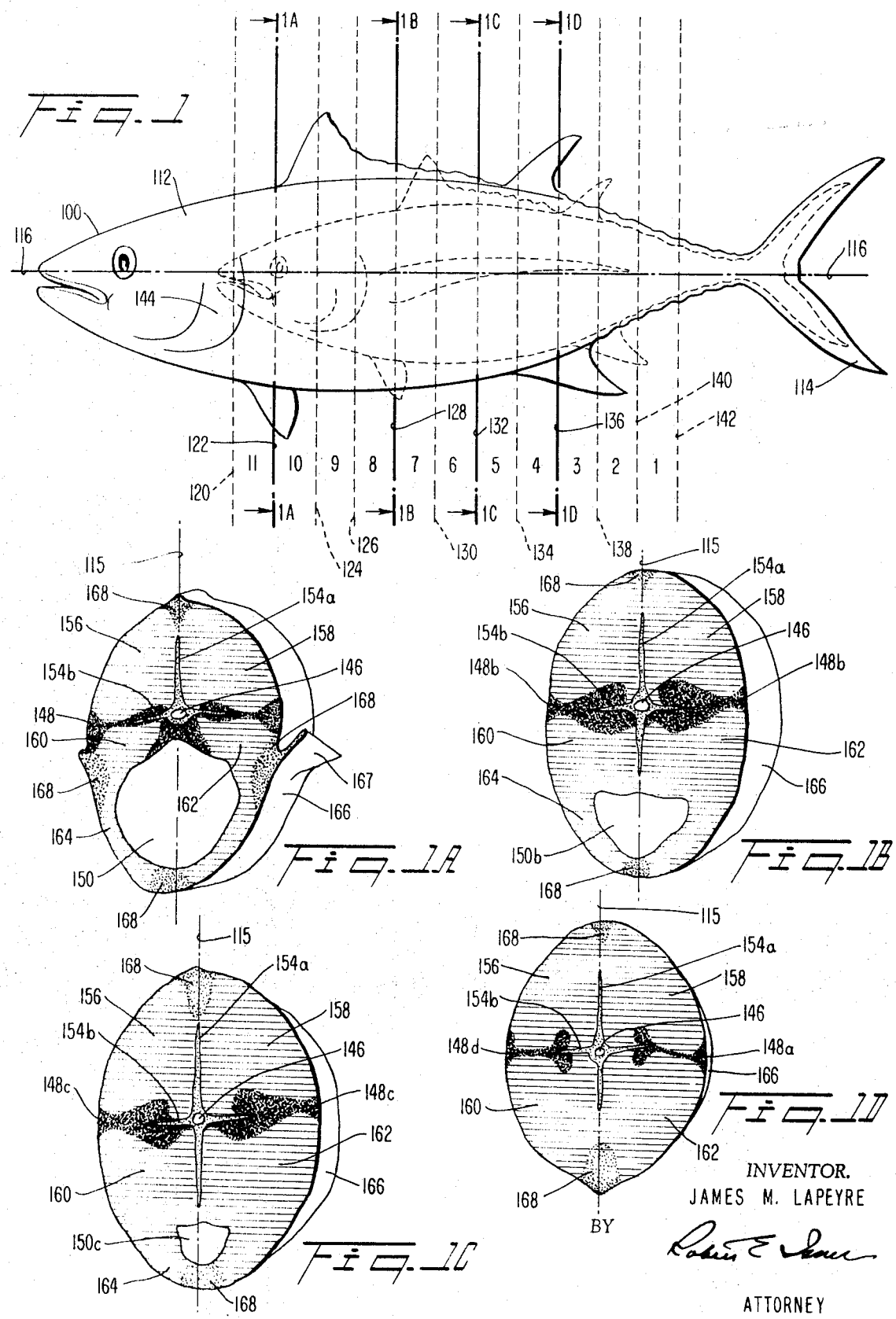

ABSTRACT OF THE DISCLOSURE

Method of processing tuna for a canned pack thereof including the preliminary subdivision of whole frozen tuna transverse to the longitudinal backbone thereof into a plurality of lateral sections of substantially uniform thickness followed by selective grading of similarly sized and configured sections thereof to facilitate subsequent processing thereon.

---

This invention relates to the commercial processing of tuna fish and particularly to a novel and improved method for the processing of can packed tuna, especially the solid and chunk varieties thereof.

Tuna comprises one of the world's leading fishery resources and such are widely distributed in temperate, semitropical and tropical waters. Insofar as United States landings are concerned, the Pacific coast catch conventionally includes albacore (*Germo alalunga*), bluefin (*thunnus thynnus*), skipjack (*Katsuwonus pelamis*) and yellowfin (*Neothunnus macropterus*). The Atlantic coast catch, which is quite small as compared to the Pacific coast catch, conventionally includes bluefin and little tuna (*Euthynnus alletteratus*). The above recognized species of tuna vary widely in size with albacore ("white meat" tuna) having a maximum weight of about 80 pounds and with the usual commercial catch weighing less than 40 pounds and averaging from about 12 to 25 pounds; Pacific bluefin having a maximum weight of about 250 pounds and with the usual commercial catch averaging from about 20 to 40 pounds; skipjack having a maximum weight of about 40 pounds and with the usual commercial catch averaging from about 4 to 20 pounds and yellowfin with a maximum weight of about 400 pounds and with the commercial catch averaging about 30 to 40 pounds. In contradistinction therewith, the Atlantic bluefin can reach a maximum weight of about 1,500 pounds or more and the commercial catches average either between 8 to 65 pounds and from 65 pounds up to 600 pounds, and the little tuna has a maximum weight of about 20 pounds and a commercial catch averaging between 5 and 10 pounds. In addition to the above five recognized species of tuna, two additional species of "tuna-like" fish are commercially canned tuna-style although they cannot be domestically labeled as "tuna." These additional species include both the Atlantic and Pacific species of bonito (*Sarda sarda* and *Sarda chiliensis*, respectively) and the yellowtail (*Seriola dorsalis*). The Pacific bonito has a maximum weight of about 25 pounds, about twice that of the Atlantic species, and the commercial catch thereof usually averages from 6 to 8 pounds while the yellowtail has a maximum size of about 80 pounds with the commercial catch averaging somewhat less than 15 pounds.

For the purpose of this application the term "tuna" will, because of the conventional commonality in both processing and pack, be considered to specifically include only the above described seven species of fish.

The nature and sequence of the basic operations involved in the conventional commercial processing of canned pack tuna are characterized by multiplicities of individual manual manipulations and operations and have generally remained, apart from improved refrigeration and some degrees of mechanization in the conveying and can filling steps thereof, essentially the same since the inception of the tuna canning industry about fifty years ago, despite the extensive efforts to improve the same in response to the demands created by a continually burgeoning domestic pack, now running about 400,000,000 pounds per year, and expanding economic pressures induced, at least in part, by continually increasing costs for the raw tuna, labor and necessary material and equipment.

For the purposes of comparison and for more distinctly pointing out the nature of this invention, the immediately following portions of this specification will generally delineate the nature of the essential steps that have been conventionally employed in the commercial processing of canned pack tuna, with the understanding that minor variations in processing techniques, method steps and equipment have been and are utilized and employed by individual canners in accord with the exigencies dictated by particular installations and by the desires of the individual processors.

The majority of the tuna catch conventionally arrives at a cannery in a frozen or partly thawed—party frozen condition and is intially subjected to a thawing operation preparatory to butchering. Immersion in water, water spraying or aircurrent exposure are commonly employed techniques to hasten thawing. Since, however, the delivered tuna are not only quite disparate and non-uniform as to size, but also may vary in condition from hard frozen to partially or even completely thawed, the requisite thawing times under present day practices vary widely and introduce problems both with respect to the size of thawing areas and facilities that are required and to the efficient scheduling of operations subsequent thereto. Thawing times of up to 12 hours or more are not unusual.

Once thawed, the tuna are tabled and individually hand manipulated and butchered by slitting the belly to permit removal of the visceral organs after which the visceral cavity is thoroughly washed out with water, the tuna inspected for spoilage and the whole tuna directed to the precooking baskets or racks for a batch type precooking operation. It is also my understanding that, in some instances, the tuna are eviscerated on board the fishing vessels, in which case the in-plant evisceration procedure is unnecessary.

In contradistinction to canned pack salmon for example, tuna requires a precooking operation which, in addition to removing unwanted moisture and excess oils, effects a sufficient deterioration of the tissues holding the loins to the bony and cartilaginous material that generally comprises the skeletal structure to permit the loins to be readily separated therefrom in a subsequent processing step. Such precooking involves exposure of batches of eviscerated whole tuna to temperatures in the order of 212–220° F. for a sufficient period of time to effect the requisite tissue deterioration in the vicinity of the spinal formations adjacent the longitudinal center of the tuna. Although a size grading of the tuna is oftentimes effected in forming the individual batches in an effort to achieve optimum cooking times therefor, a fairly wide variation in size of tuna is usually still present with a concomitant unavoidable variation in the degree of cook within the tuna. In addition, the time of the "precook" for individual batches varies widely due to the inevitable disparate sizes of tuna involved. For example, the cooking time may vary from 1½ hours for very small tuna up to 8 to 10 hours or more for larger tuna.

Apart from the excessive time periods involved and consequent inherently inefficient utilization of cooking facilities, the uneven or compromise nature of the cooking operations results in non-uniform cooking and can often result in both undercooking and overcooking of tuna cooked in the same batch, as well as undercooking and overcooking of portions of individual tuna. Undercooking not only results in the production of an inferior product characterized by excessive weight loss in the can but also renders subsequent separation of the loins from the skeletal structure more difficult, with a consequent increase in expense and loss of valuable product. Overcooking, in contradistinction therewith, results in excessive weight loss prior to canning due to undue loss of natural oils, juices and moisture and oftentimes is accompanied by a deleterious color transferral from the less valuable blood meat portions into the more desirable adjacent light meat portions of the loins, with a consequent diminution in product value.

Following the precook under present day practices, the precooked tuna must, because of its friable and fragile nature while warm, be cooled thoroughly to firm up the flesh before further processing can be effected and here again the time required will vary widely both in accord with the nature of the cooling facilities employed and the size of the tuna. Cooling periods can vary in amount from a few hours up to 12 or 16 hours or even more and during which time the tuna are subject to the deleterious exposure to air and enzyme action.

Even more important than the above from an economic standpoint are the weight losses attributable to uncontrollable shrinkage that inherently results from the above described conventionally employed precooking and cooling operations. According to a Special Scientific Report: Fisheries No. 104 of the Fisheries and Wildlife Service of the United States Department of the Interior, shrinkage in amounts of up to 30% of the weight of the tuna takes place during the precooking and cooling operations, with two thirds to three fourths thereof taking place during the cooking as distinguished from the cooling operation. Such shrinkage is effectively caused by loss of oil, solids, dissolved protein and other tissue constituents and moisture during cooking and by loss of moisture due to evaporation and drip during cooling. Some reduction in weight of the raw tuna is inherent and necessary, but such uncontrolled loss is wasteful and therefore costly. Since the cost of the basic raw tuna represents about 70% of the processor's cost, it has long been recognized that any savings that could be effected in the shrinkage that inherently accompanies the precooking and cooling operations would be of the greatest importance. The distinct and serious disadvantages above noted which flow from the inherently uneven and non-uniform nature of the required precooking and associated cooling and antecedent operations have long been recognized and suggested avoidance thereof through efforts represented, for example by Borg Pat. No. 2,411,188; Stevenson et al., Pat. No. 2,635,050; Berglund Pats. Nos. 2,534,219 and 2,612,652; and the Anderson-Jann-Carruthers Pats. Nos. 2,954,298 and 3,152,912 have not been commercially accepted to any appreciable extent and the basic problems are still extant.

Subsequent to the above described precooking and cooling operations, the whole cooked and cooled tuna are routed to tables and are there individually manually manipulated and cleaned. Conventionally, the cleaning of the tuna, the head and tail is removed and the skin and fins are scraped off, after which the tuna is split and the backbone removed. Each half is split again longitudinally to form a pair of discrete dorsal loins, i.e., the right and left epaxial muscles, and a pair of discrete ventral loins, i.e., the right and left hypaxial muscles. The blood and associated dark meat portions are then scraped away and the loins, edible flakes and waste products are selectively routed to separate processing stations for further operations thereon. As noted above, manual labor is conventionally employed for the above described cleaning step and the rate at which tuna can be cleaned varies with both the skill of the worker and with the size of tuna being handled. The costs involved and the essentially distasteful nature of the cleaning operation have created a recognized and long standing need for mechanization of the cleaning steps. However, the disparate sizes of the whole tuna being processed and their inherent non-symmetrical character have been material factors contributing to the awareness of the industry that the problems faced were not easy of solution and to the inability of the industry, despite widespread effort, to solve the same.

Following the cleaning operation, the separated loins are either hand or machine packed into cans with an accompanying guillotine type shearing operation across the grain of the cooked loin to form can depth segments thereof for a solid pack or to form smaller segments for a chunk pack thereof, both of which are attended by undesired flaking and grating at the locus of the cut. The flaked and grated meats are then separately packed. Except for dietary or other special packs, vegetable oil and salt are added to the canned product after which the cans are conventionally sealed, retorted and labeled.

It should be noted from the foregoing that the total processing time, from the commencement of the thawing operation to the final can filling operation, can be as much as 38 hours, and even this period is frequently exceeded by some processors.

In its broader aspects, the subject invention may be briefly described as an improved method for the commercial processing of canned pack tuna which includes sub-dividing the principal loin bearing portions of uncooked tuna generally transverse to the longitudinal axis and the natural flesh grain thereof into a plurality of discrete lateral sections having a predetermined thickness with preferential operation including the sub-dividing of the tuna while in substantially frozen condition into lateral sections of effectively uniform thickness which, after cooking, will complement, either singly or in multiples, the depth of the can to be filled. In its more narrow aspects, the subject invention includes the additional processing steps of grading as by sorting and routing, similarly sized and/or anatomically configured laterally cut sections into predetermined groupings thereof to permit both uniformity and automation of further processing thereof, preliminary cleaning of the visceral portions of the lateral sections while in frozen or partly frozen condition, separation of the edible loin portions of said lateral sections from the remainder thereof and accumulation of said loin portions into a mass of substantially uniform thickness from which selectively sized portions may be removed for introduction into cans or other suitable containers. In a still more narrow aspect, the subject invention includes the separation of the edible loin portions of said lateral sections from the remainder thereof and accumulation of said loin portions, while such are in a raw condition, into a composite mass of suitable geometric configuration having a substantially uniform thickness in cross section and wherein the natural flesh grain of the loin portions is maintained in generally parallel relationship, the precooking of said composite mass and subsequent removal of selectively sized portions thereof for introduction into cans or other suitable containers. Such composite mass of edible material may, if desired, be sub-divided prior to cooking so that the resultant divisions thereof will, after cooking, be sized to closely complement not only the depth of the can but also the volume thereof.

Among the advantages attendant to the practice of the subject invention is a permitted minimization, if not substantial avoidance, of the deficiencies inherent in present day processing techniques with a consequent reduction in wastage and upgrading of quality with attendant economic savings including a permitted minimization and standardization of thawing, precooking and cooling times, a substantial reduction in overall processing time from receipt of the frozen tuna to delivery of the canned product, a substantial reduction in the amount of hand labor required to process a given tonnage of tuna, a marked increase in the tonnage of tuna processable per worker and a marked reduction in required physical effort by the workers due to the reduction in size of the workpieces being handled. Still other advantages include a readily permitted mechanization and automation of operations leading, in substantial degree, to continuous flow operations which may exemplarily include compact continuous cookers, automatic or semi-automatic evisceration and skinning of the tuna, and selective separation of the thin belly meat portions from the remainder thereof. Further advantages include a permitted expeditious removal of the blood meat prior to cooking, if desired, and simplified removal of the loin meats from the skeletal structure with concurrent provision of loin meats cut to desired length and in proper grain orientation with a minimum of attendant flaking or grating thereof.

The primary object of this invention is the provision of new and improved methods for the commercial processing of canned pack tuna.

Other objects of the invention include the provision of improved processing steps and methods for the realization of the advantages set forth above and such, together with further objects and advantages, will become more apparent from the following portions of this specification which sets forth, in conjunction with the attached illustrative drawings, certain presently preferred operational processing steps incorporating the principles of the invention in the commercial processing of tuna for a canned pack thereof.

Referring to the drawings:

FIG. 1 is a schematic side elevational view of a tuna having a smaller tuna superimposed thereon in dotted outline for illustrative purposes;

FIG. 1-A is an oblique view of a lateral section of the larger tuna as severed on the line A—A of FIG. 1;

FIG. 1-B is an oblique view of a lateral section of the larger tuna as severed on the line B—B of FIG. 1;

FIG. 1-C is an oblique view of a lateral section of the larger tuna as severed on the line C—C of FIG. 1; and FIG. 1-D is an oblique view of a lateral section of the larger tuna as severed on the line D—D of FIG. 1.

Because of the widespread use of modern refrigerated fishing vessels, tuna is usually frozen at sea at the present time and is received at processing plants in whole frozen or substantially frozen condition. In accordance with the principles of this invention, the received raw tuna after desirably being subjected to a preliminary grading or sorting as to size, and as exemplified by the tuna 100 in FIG. 1, is initially subdivided into a plurality of discrete lateral sections, as for example sections numbered 1 through 11, commencing from line 142 located near the tail, by cutting the loin bearing portions thereof generally transverse, or at a predetermined angle relative to the longitudinal spine or backbone (as generally represented by the longitudinal axis 116) at a plurality of spaced locations, as exemplarily illustrated by the dotted lines 120, 122, 124, 126, 128, 130, 132, 134, 136, 138, 140 and 142. Preferably such lateral sections are of uniform thickness, at least over the extent of the main body of the tuna, and are longitudinally dimensioned so as to be ultimately complemental, either singly or in multiples to the depth of the can to be employed. Such operation can be readily effected by a variety of automatic or semi-automatic sawing or cutting equipment with concomitant economic savings and is preferably effected while the tuna is in a frozen or at least partially frozen condition.

The above subdivision step not only permits immediate removal of the head 112 and tail 114 portions for separate processing, either immediate or future, but also serves to convert the whole tuna into discrete, readily handlable, manipulable and sortable segments that are of convenient size and shape for subsequent processing steps and operations thereon.

As is apparent from the foregoing and as illustrated in the drawings, while all of the sections are of generally oval shape and of uniform thickness, both the diametric size and the internal anatomic character or configuration of the individual lateral sections from a given tune will vary in accord with the location from which they are derived. In addition, the diametric size of the lateral sections will also vary in accord with the size of tuna being processed. FIGS. 1-A through 1-D are intended to be schematically illustrative of the general internal character or anatomic configuration of certain of the discrete lateral sections from a given tuna in accord with the location from which they are derived. FIG. 1-A illustrates the general nature of the internal anatomic configuration that would be expected from lateral section No. 10 disposed slightly to the rear of the gill area 144 and at the locus of articulation of the pectoral fins 167. As there shown, such section will include an essentially centrally located and axially disposed portion of the spine or backbone 146 having the usual neural spines 154a extending upwardly and the epicentral ribs 154b extending laterally therefrom serving to generally delineate and separate the right and left epaxial muscle portions 156 and 158 constituting the edible dorsal loin portions thereof and the right and left hypaxial muscle portions 160 and 162 constituting the edible ventral loin portions thereof. In this transverse section, the ventral loin portion merges into the relatively thin belly meat portions 164 that surround the visceral cavity 150, which is of near maximum diametric extent at this particular location. As generally indicated at 148, the dorsal and ventral loin portions are at least partially separated by laterally extending blood meat portions which, of course, are removed at some point during the processing as are the tough cartilaginous materials 168 located adjacent the pactoral, dorsal and ventral fins.

Lateral section No. 7, as illustrated in FIG. 1-B, is one of the sections of maximum diametric extent as taken from approximately the mid-length of the tuna. At this location, the visceral cavity 150b is generally of markedly diminished extent and both the edible loin portions and inedible blood meat portions 148b are appreciably larger than was the case with section No. 10. In a similar manner, lateral secton No. 5, as llustrated n the FIG. 1-C, generally delineates a visceral cavity 150c of further diminished size and blood meat portions 148c of somewhat decreased size in a section of slightly reduced diametric extent. In contradistinction therewith, FIG 1-D illustrates the general character of one of the rear sections, i.e., No. 3, wherein the blood meat portions 148d are again of reduced extent.

FIG. 1 also shows the variation in diametric extent between different size tuna, wherein the illustrated subdivision of a smaller tuna, as indicated by the dotted outline, also will result in the provision of a plurality of discrete lateral sections of the same thickness as those obtained from the larger tuna but of lesser number and of lesser diametric extent. As illustrated in the drawing, the smaller tuna, when subdivided in accord with the principles of this invention, will illustratively provide eight useable discrete lateral sections as distinguished from the exemplary eleven on the larger tuna. However, as will be apparent to those knowledgeable in this art, the general internal character and anatomical configuration of the discrete lateral sections, which is determined by the location from which they are derived, will remain generally similar for both large and small tuna of the same specie but will, of course, differ as to size.

The above described subdivision of the whole tuna into discrete lateral sections provides readily handleable and manipulable segments each generally symmetrical about the dorsal to ventural plane 115 and renders possible the sorting of individual sections obtained from pluralities of tuna into predetermined groupings according to the general internal anatomical characteristics or configurations thereof to markedly facilitate specific subsequent operations such as evisceration (when required), skinning, removal of blood meat, skeletal structure, cartilaginous materials and the like. Moreover, when the whole tuna are initially sorted as to size and specie as mentioned earlier and the resulting multiplicities of whole tuna of the same size and specie are then subdivided into transverse sections, the sorting of the sections in accord with their anatomical configuration automatically effects a dimensional sorting of the sections as well, which markedly facilitates those subsequent processing operations wherein size may be a critical parameter.

Additionally and if desired, the sections may be graded as to quality so as to separate and route the choicest sections for processing as extra fancy pack or the like. In all cases, however, the selectively permitted sorting and grading of the lateral sections not only renders manipulation thereof more facile but also makes feasible the utilization of automatic and semi-automatic processing machinery and apparatus, the use of which has been heretofore effectively precluded by the asymmetric configurations of the workpieces inherently present in the conventional processing of the whole tuna, as described earlier.

As pointed out above, a salient and necessary step in the practice of the subject invention is the initial sub-division of at least the loin bearing portions of the uncooked tuna into a plurality of substantially lateral sections of predetermined and preferably uniform thickness which may then be selectively handled and processed, all to the end of thereafter separating at least a majority of the edible loin portions of said lateral sections from the remainder thereof to form discrete portions of cannable material substantially free of undesired scrap and subsequently introducing said cannable material into cans. Among the advantages of the above described initial sub-division of the uncooked tuna into discrete lateral sections is a permitted flexibility of subsequent operating steps and procedures which enables processors to modify basic procedures in accord with the exigencies of particular processing plant facilities, general nature of the catch, labor availability and types of available apparatus and machinery.

In the interest of clarity and by way of illustrative example the nature of the subsequent processing steps includable in the practice of the invention that will be hereafter initially described will, except for skinning operation which is preferably performed while the lateral sections are uncooked, and the possible avoidance of thawing as a discrete operation, generally conform in overall sequence with those now conventionally employed and such will be followed by a brief disclosure of some presently preferred variations and modifications therein.

Thus, in the exemplary practice of the subject invention in its broad aspects as described above, the same essential subsequent processing steps as are now conventionally practiced, with the possible exceptions noted above, may be retained in whole or in part. As will become apparent, however, the relatively diminutive size and permitted comparative uniformity of the discrete lateral sections and particularly after grading and sorting thereof affords an ease of manipulation, a uniformity of treatment and a permitted automation and/or mechanization that has been heretofore unobtainable. Thus, by way of illustrative example, the discrete lateral sections may, after preliminary grading as to size and/or anatomic character, if such be required by the nature of the facilities, be subjected to an initial thawing operation. For such thawing, the conventionally employed techniques such as water immersion, water spraying or exposure to ambient or heated air streams may be employed. In any case, however, since the discrete lateral sections are of diminutive size compared to whole tuna, present a much larger surface to volume ratio and are generally of uniform thickness, the requisite thawing time will not only be markedly decreased to a fraction of that normally required, but will approach a degree of uniformity in thawing time heretofore unobtainable. As will now be apparent, such resultant reduction and uniformity of thawing times will not only facilitate use of improved and specially designed thawing equipment, perhaps even of a continuously operable or automated character of special design, but will also facilitate plant scheduling and continuous flow type operations.

In the practice of the improved methods, the thawed lateral sections may next be preliminarily cleaned (where prior evisceration has not been performed) by simply flushing the visceral portions with water out through the now open ends of the sectional visceral cavity 150 leaving the thin edible belly meat 164 that peripherally surrounds the same intact. Such not only constitutes a markedly simplified evisceration technique but permits a shortened time period during which the thawed and highly spoilable viscera is allowed to remain in close proximity to the edible tuna flesh, as well as providing a preliminarily cleaned product that is readily subject to visual inspection.

If desired at this time, the thin belly meat section 164 may be removed from the remainder of the lateral sections by simple severing thereof at a desired location to facilitate ultimate utilization thereof.

Such preliminarily cleaned lateral sections may then be suitably subjected to the requisite precooking operation. Because of the permitted preselection and preferable uniformity of thickness of the discrete lateral sections, the precooking time is not only appreciably reduced to a small fraction of the time conventionally required, but is also of a permitted highly uniform and predictable character. Such advance permits not only the utilization of more compact and efficient cooking equipment, but also facilitates the utilization of continuous cookers in a continuously operable flow path. Moreover, the permitted uniformity of thickness of similarly sized lateral sections permits the ready selection and control of cooking time in accord with the thickness and character of the sections and thereby minimizes, if not wholly avoids, the deleterious undercooking and overcooking characteristic of present day practices and as described above. In addition to the foregoing, the controllability of the precooking effects a commensurate control over the degree of shrinkage encountered and thus permits closely controlled preselection of the desired thicknesses of the discrete lateral sections so as to cause the sections of cooked meats to be closely complemental to the depth of can being filled. Likewise, the cooling operation subsequent to the precook is not only markedly decreased in time, but may also be tailored for highly efficient operation which may incorporate the use of continuously operable cooling equipment of specialized design.

Following the cooling step, and if not previously performed prior to cooking and preferably while in a frozen or partly frozen condition, cleaning of the section is completed by removal of the peripheral band of skin 166, and the cartilaginous material 168 from the refirmed lateral sections so as to peripherally expose the meat portions thereof. Because of the reduced size of the sections and their generally symmetrical and uniform oval and slightly truncated shape removal of the skin may also be readily effected by semi-automatic or automatic equipment of specialized design.

Subsequent to the post cook skinning step, when required, the meat portions, including the dorsal and ventral loins, may be separated from the skeletal structure, and are of a thickness complemental to the depth of can into which they are to be packed either singly or in multiples. Such separation of the loin portions of desired thickness is not only readily and easily effected due to the improved workpiece configuration and uniformity of cook, but such also provides the loin meat cut to length and requiring no wasteful cutting across the grain, thereby maximizing the yield of solid and chunk packable meats and minimizing grating and flaking thereof. In addition, it should be noted that, after separation as described above, the blood meat pattern for any section will be not only essentially symmetrical but will be well delineated in cross section, thus facilitating and simplifying its removal.

As pointed out earlier, the initial sub-division of the tuna into discrete lateral sections thereof of predetermined thickness readily permits variations to be introduced in both sequences of operation and in the character of the individual tuna processing steps in accord with the exigencies of the particular catch and the dictates of a particular processing plant and available equipment. By way of illustrative example, the preliminary removal of the visceral portions of those lateral sections containing the greater portions thereof may, after a requisite preliminary grading or sorting as to character and size, be automatically effected on the frozen stock by the use of suitable coring or punching apparatus. Likewise, cleaning as by removal of the peripheral band of skin from the sections is most desirably effected while the sections are in at least a partially frozen condition and wherein only the skin has begun to thaw. In this condition, the skin has not been softened by cooking and, therefore, its natural toughness allows it to be readily pulled or peeled free from the frozen section by semi-automatic or automatic equipment of special design. Likewise, the relatively thin belly sections can be removed for separate and selective handling prior to the cooking operation either before or after the thawing stage. Again, if a requisite sorting and grading of the discrete lateral sections has been effected, the blood meat 148 and cartilaginous portions 168 may be removed from the frozen or partially frozen stock prior to any cooking operations, thereby precluding discoloration of the loin meat by the blood meat portions, by a coring, punching or other suitable operation.

Because of the selectivity permitted as to which tuna parts are to be cooked, the individual processor is not compelled, as at present, to cook scrap along with the edible portions of the tuna, thereby permitting a reduction in total tonnage of material subjected to the pre-cook in order to recover a given tonnage of canned material. This not only permits avoidance of scrap flavor contamination of the edible flesh, but obviously permits increases in cooker efficiency and reduced fuel costs. Further, since some products derived from the scrap do not necessarily benefit from the same pre-cook required for the loin meat, an upgrading and diversification of tuna by-products is possible by tailoring the processing of the fresh frozen natural scrap material to suit specific by-product manufacture independently of the canned tuna.

By way of further illustrative examples, the remaining portions of this specification will delineate certain steps of a presently preferred and essentially comprehensive processing procedure that is adapted to approach, if not attain, maximal realization of the benefits that are inherent in the practice of the subject invention. While such comprehensive processing procedures, because of existing physical facility limitations and requisite alterations attendant the adoption of totally new techniques and equipment, will probably only ultimately be adopted in their entirety, the individual steps may be progressively adopted by processors as modifications and changes in plant facilities permit.

Such preferred method includes, following a preliminary sorting as to size and species if required by the catch, the initial subdivision of the principal loin bearing portions of whole frozen tuna generally transverse to the longitudinal axis thereof into a plurality of discrete lateral sections of substantially uniform thickness, as heretofore described. The individual lateral sections, while still in a frozen condition, are then sorted into predetermined groupings of similarly sized and anatomically configured workpieces thereof for selective treatment in accord with their physical characteristics. Following the sorting step, the selectively constituted groups are, while still in frozen or partially frozen condition, eviscerated and skinned with such operations being readily automated because of the uniform character and known anatomical configuration of a given workpiece.

The sequence of operations following the evisceration and skinning will be determined in part by the availability of automated equipment selectively designable in accord with the size and anatomical configuration of the sections being handled. For example, and under one suggested procedure, the loin portions of the individual sections will next be separated from the skeletal structure to provide discrete segments roughly of quadrant configuration. The segments obtained from the dorsal and rear ventral loins will then be finally cleaned by removal of the blood meat portions therefrom. Preferably such separation and cleaning are effected while the tuna is in a frozen or partially frozen condition, since the rigidity of the workpiece will facilitate both handling and the automation of operation. In addition, working the tuna sections while frozen or partially frozen minimizes the possibility of spoilage and contributes to the provision of a superior product to the ultimate consumer. The fore ventral loin segments will normally further require the selective removal of the additional fine bone structure that surrounds the fore portion of the visceral cavity.

Such finally cleaned loin segments are then preferably accumulated and compacted into a mass having the segments disposed in contiguous and abutting relation with each other and with a selected overall or peripheral uniform geometric configuration and a substantially uniform cross-sectional thickness equal to the thickness of said loin segments. The width of such mass may be complemental to the width of a single can or to a plurality of can widths. Such a compacted mass may be continuously formed and may be pre-divided into selectively sized smaller masses as pointed out earlier.

The compacted mass of tuna is then desirably subjected to the requisite pre-cook operation. Such pre-cooking causes the compacted individual segments of tuna meat to adhere to one another, thus permitting a readily obtainable increase in the percentage of the more valuable chunk and solid pack varieties of canned tuna than is conventionally obtainable. Likewise, if care is taken prior to pre-cooking to maintain the natural flesh grain of the segments in the compacted mass in generally parallel relationship among the segments constituting the same then, subsequent to pre-cooking, the multiple loin segments forming any given can sized portion will appear, except upon close scrutiny as a single loin.

Packing may be readily effected by selective removal of can-size portions from the compact mass of cooked tuna either by separating the cooked mass of tuna at pre-established dividing locations, or by coring or the like with an accompanying introduction of such removed portions into adjacent cans. The shape of the removed portion may be complemental to that of the container but, preferably, and in order to reduce wastage and minimize re-handling of the unremoved portions of the mass, the removed shape is preferably of rectilinear configuration and is then subsequently rounded or otherwise complementally shaped for introduction into conventional cans.

The separation of the edible loin portions from at least some frozen sections and from the viscera, skin, skeletal structure, blood meat and cartilaginous portions thereof may be effected in a single operation where a high degree of uniformity in the sorted sections will economically permit the same. Such can be effected by coring out only the desired loin portions (and thereby leaving the scrap portions substantially unseparated) by a single coring or punching operation employing selectively configured coring dies and/or punches of roughly quadrant shape and being selectively sized and shaped in accord with the dictates of the physical characteristics of the pre-sorted sections being handled. With such combined separation and cleaning, the dorsal loin portions and the rear ventral loin portions may be directly accumulated into a composite mass as described above and subjected to cooking and packing as heretofore described. The fore ventral portions may require an additional final cleaning step to remove the above described undesired bone structure therefrom, after which the finally cleaned portions may be processed as heretofore described.

Having thus described my invention, I claim:

1. In the commercial processing of tuna for a canned pack thereof, the steps of subdividing the principal loin bearing portions of a substantially whole tuna prior to the precooking thereof generally transverse to the longitudinal axis thereof into a plurality of discrete lateral sections of predetermined thickness, separating at least a substantial portion of the edible loin portions of said sections from the remainder thereof to provide discrete cannable material, precooking at least the loin portions of said sections, and introducing said precooked loin portions into cans.

2. The method as set forth in claim 1, including the step of removing at least the major portion of the material disposed within the visceral cavity portions of said sections prior to pre-cooking.

3. The method as set forth in claim 1, including the step of removing at least the major portion of the skin from the said sections prior to pre-cooking.

4. The method as set forth in claim 1, including the step of sorting said discrete lateral sections in accord with their physical characteristics of facilitate uniformity of treatment thereof in subsequently applied processing operations.

5. The method as set forth in claim 1, wherein said tuna is laterally subdivided while in at least partially frozen condition.

6. The method as set forth in claim 1, wherein at least a substantial number of said lateral sections are of substantially uniform thickness.

7. The method as set forth in claim 4, wherein said sorting of said discrete lateral sections is in accord with the diametric dimensions thereof.

8. The method as set forth in claim 4, wherein said sorting of said discrete lateral sections is in accord with the internal anatomical configuration thereof.

9. The method as set forth in claim 4, wherein said sorting of said discrete lateral sections is in accord with the anatomic location of the tuna from which the sections are derived.

10. The method as set forth in claim 4, wherein said sorting of said discrete lateral sections is in accord with the size of the whole tuna and the anatomic location thereof from which said sections are derived.

11. The method as set forth in claim 10, wherein said tuna is subdivided, preliminarily cleaned and separated while in at least a partially frozen condition.

12. The method as set forth in claim 10, including the step of accumulating the separated discrete cannable material into a composite mass of substantially uniform thickness.

13. In the commercial processing of tuna for a canned pack thereof, the steps of subdividing the principal loin bearing portions of a substantially whole tuna prior to the pre-cooking thereof generally transverse to the longitudinal axis thereof into a plurality of discrete lateral sections of predetermined thickness, sorting said discrete lateral sections in accord with their physical characteristics to facilitate uniformity of treatment of like sections in subsequently applied processing operations, separating at least a substantial portion of the edible loin portions of said sections from the remainder thereof to provide discrete cannable material, pre-cooking said cannable material, and introducing said pre-cooked cannable material into cans.

14. The method as set forth in claim 13, wherein said pre-cooking is effected by exposure of pluralities of the said loin portions of the lateral sections to elevated temperatures for periods of time determined by the thickness of said sections.

15. The method as set forth in claim 13, wherein said tuna is laterally subdivided while said tuna is in at least a partially frozen condition.

16. The method as set forth in claim 13, including the step of accumulating said separated discrete cannable material into a composite mass of predetermined geometric configuration.

17. The method a set forth in claim 16, including the step of dividing said composite mass into cannable portion prior to the pre-cooking thereof.

18. The method as set forth in claim 16, including the step of removing can sized portions from said mass subsequent to the cooking thereof.

19. The method as set forth in claim 16 wherein said discrete cannable material is in composite mass configuration.

20. The method as set forth in claim 17 wherein said cannable portions are of generally rectilinear configuration, and including the step of re-shaping said cannable portions to a configuration complemental to that of the can into which they are to be introduced.

21. The method as set forth in claim 18, wherein said can sized portions are of generally rectilinear configuration, and including the step of re-shaping said can size portions to a configuration complemental to that of the can into which they are to be introduced.

22. In the commercial processing of tuna for a canned pack thereof the steps of sub-dividing the principal loin bearing portions of a substantially whole at least partially frozen tuna generally transverse to the longitudinal axis thereof into a plurality of discrete lateral sections of predetermined thickness, sorting said discrete lateral sections in accord with their physical characteristics into groupings of predetermined character to facilitate uniformity of treatment of said groupings in subsequently applied processing operations, removing the peripheral band of skin from said sections while the latter are at least in partially frozen condition, and separating edible loin portions of the skinned sections from skeletal structure incorporated therein preparatory to the pre-cooking thereof.

23. The processing method as set forth in claim 22 including the step of accumulating the separated edible loin portions into a mass of substantially uniform thickness and at least partially cooking said tuna while the same is in said accumulated mass form.

24. The method as set forth in claim 23 wherein said tuna is in partially frozen condition when subjected to said cooking step.

25. The method as set forth in claim 23, including the step of removing can sized portions from said mass subsequent to the cooking thereof.

26. The method as set forth in claim 25 wherein said can sized portions are of generally rectilinear configuration and including the step of reshaping said can size portions to a configuration complemental to that of the can into which it is to be introduced.

27. The processing method as set forth in claim 22 including the steps of accumulating and compacting pluralities of the separated edible portions into a mass of substantially uniform thickness, said mass being divisible into can sized portions, and at least partially cooking said accumulated mass of edible portions prior to division thereof into can sized portions.

28. In the commercial processing of tuna for a canned pack thereof,
the steps of
subdividing the principal loin bearing portions of a substantially whole uncooked tuna generally transverse to the longitudinal axis thereof into a plurality of discrete lateral sections of predetermined thickness,
separating at least a majority of the edible loin portions of said sections from the remainder thereof to provide discrete material suitable for canning,
accumulating said separated discrete material into a mass of substantially uniform thickness, and
thereafter precooking same.

29. The method as set forth in claim 28 including the step of subdividing said accumulated mass of material into selectively sized segments thereof.

30. The method as set forth in claim 29 including the step of
sorting said discrete lateral sections in accord with their physical characteristics to facilitate uniformity of treatment thereof in subsequently applied processing operations.

References Cited

UNITED STATES PATENTS

| | | | |
|---|---|---|---|
| 3,152,912 | 10/1964 | Carruthers et al. | 99—111 |
| 3,124,469 | 2/1964 | Carruthers | 99—188 |

RAYMOND N. JONES, Primary Examiner

R. M. ELLIOTT, Assistant Examiner

U.S. Cl. X.R.

17—45; 99—188, 195